Feb. 8, 1927.

C. FROESCH

DRIVE FOR VEHICLES

Filed July 1, 1926

Inventor
Charles Froesch.
By his Attorneys
Redding, Greeley, O'Shea & Campbell

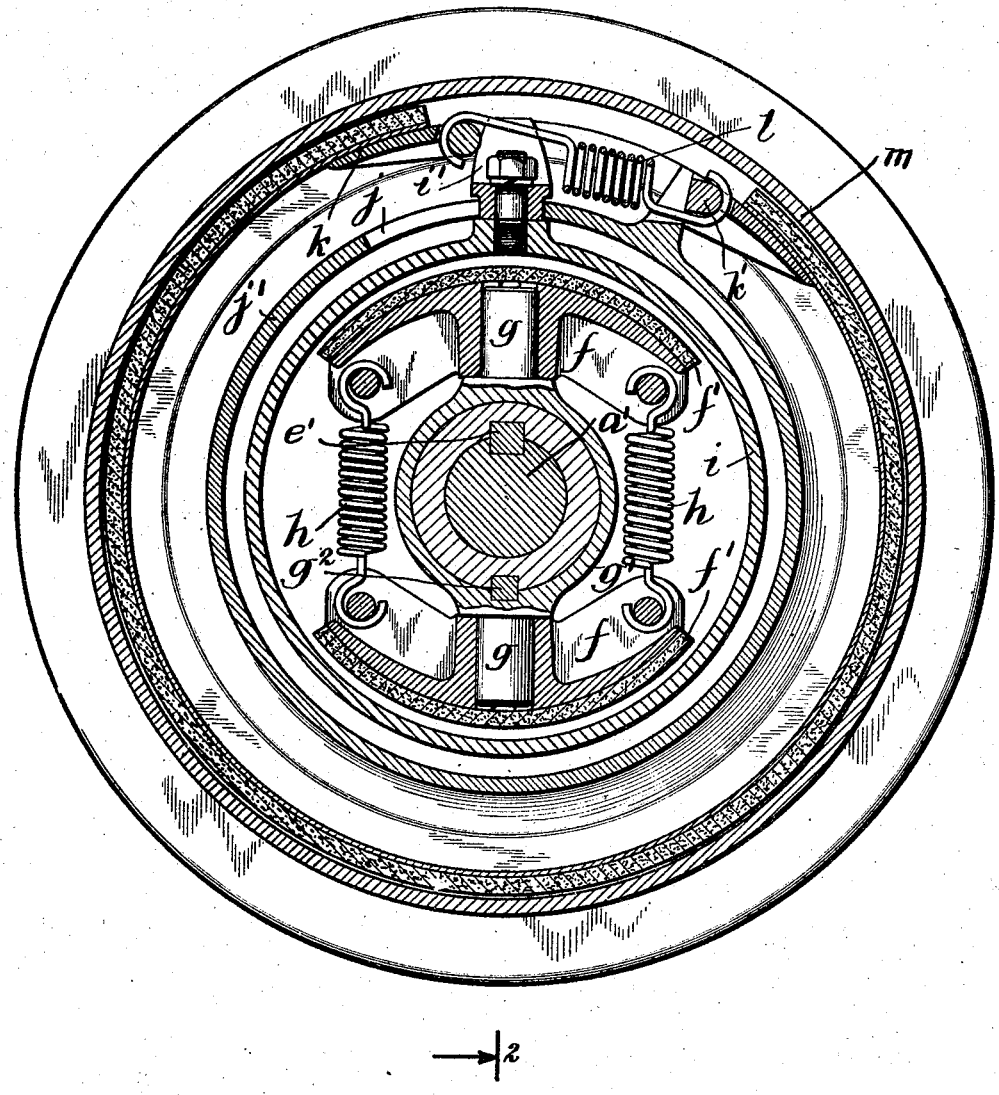

Patented Feb. 8, 1927.

1,616,617

UNITED STATES PATENT OFFICE.

CHARLES FROESCH, OF NEW YORK, N. Y., ASSIGNOR TO INTERNATIONAL MOTOR COMPANY, OF NEW YORK, N. Y., A CORPORATION OF DELAWARE.

DRIVE FOR VEHICLES.

Application filed July 1, 1926. Serial No. 119,872.

This invention relates to what is known to the trade as a gas electric drive particularly applicable to heavy duty trucks and the like. To utilize a gas electric drive in vehicles of this nature without sacrifice of the pulling ability afforded by the requisite transmission gear ratio and driving chain, it is necessary to provide at least a 16 to 25—1 gear ratio between the electric motor and the rear wheels in order that a small motor may be used and the weight of the structure kept down to a practical amount.

One difficulty in the application of a gas electric drive to heavy duty trucks is that should the truck with such a high gear ratio coast down hills, for instance, at a very high speed an excessive electric motor speed will result. As the limiting peripheral speed of a motor armature of the size necessary is limited to about 10,000 ft. per minute, it will be obvious that means must be provided (if gas electric drives are to be applied to trucks of this character) which will prevent the limiting peripheral speed of the motor armature from being exceeded. This the present invention seeks to accomplish by utilization of the centrifugal force of given weights to apply a mechanical brake to the motor shaft, the parts being so proportioned that this limiting speed may be held to any given rate.

The invention also resides in the structural features adapted to electric motors of standard design from the standpoint of practicability in manufacture and use.

Reference will now be had to the accompanying drawings illustrating a preferred embodiment thereof, in which:

Figure 3 is a transverse vertical sectional view taken in the plane indicated by the line 3—3 in Figure 2 and looking in the direction of the arrows and showing particularly the automatic braking mechanism according to the invention.

Figure 1:
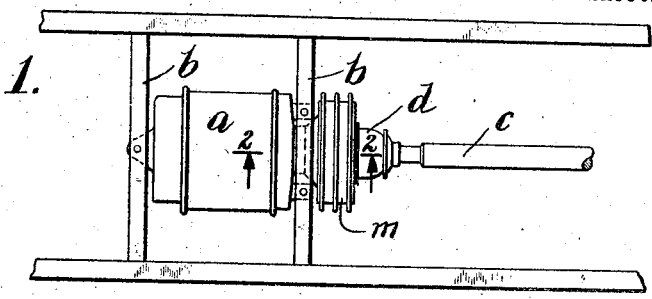
Figure 1 is a fragmentary view of the chassis frame of a motor vehicle supporting an electric motor to which the automatic brake devices according to the present invention have been applied.
Figure 2:
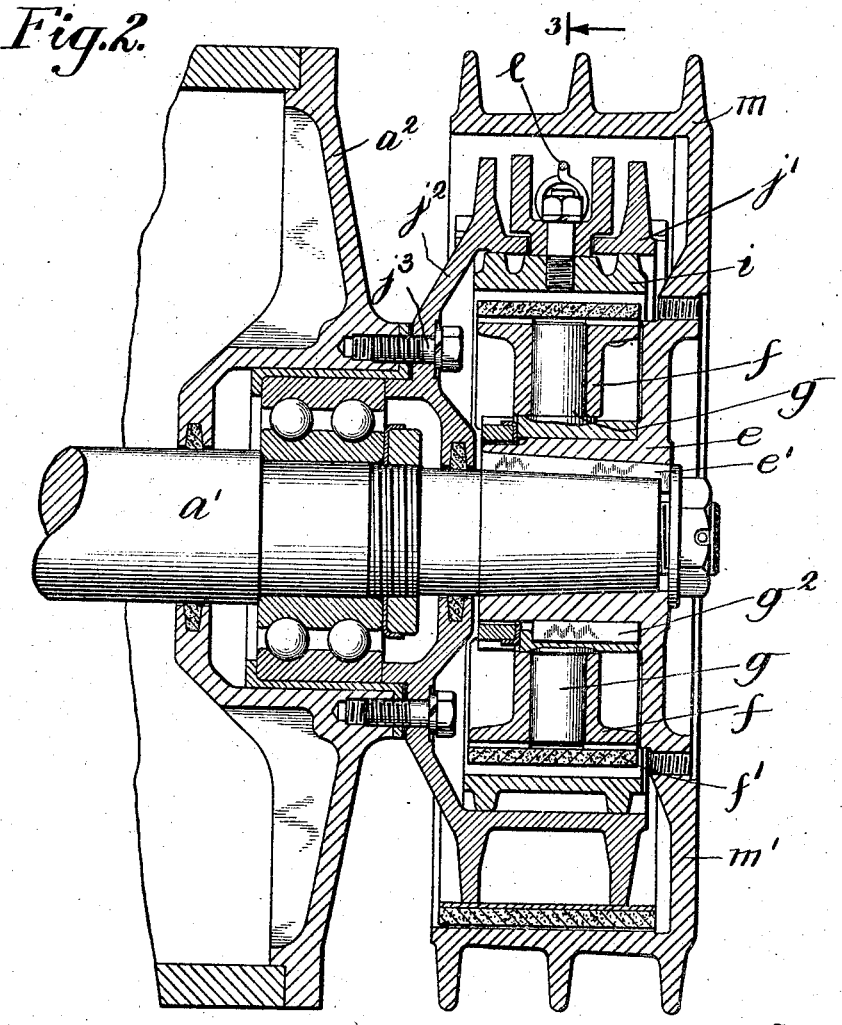
Figure 2 is a vertical longitudinal sectional view taken in the plane indicated by the lines 2—2 of Figures 1 and 3 and looking in the direction of the arrows, and showing a fragmentary portion of the motor shaft and the automatic braking devices connected thereto.

The electric motor $a$ is supported, preferably rearwardly of the engine and generator, from transverse members $b$, $b$ of the chassis frame of the vehicle, the rear wheels being driven from a rearwardly extending propeller shaft $c$ connected, through the universal joint $d$, to the hub $e$ which is keyed, as at $e'$, to the end of the armature shaft $a'$ of the electric motor. Should the peripheral speed of the propeller shaft $c$ exceed the limiting peripheral speed of the motor armature, say when the vehicle coasts down a hill at very high speed, weights $f$, $f$ slidable on the arms $g$ of a spider $g'$, keyed as at $g^2$, on the hub are caused to move outwardly under the action of centrifugal force against the action of limiting springs $h$, $h$ and to bear against a loosely positioned brake drum $i$. These weights $f$ take the form of brake shoes bearing linings $f'$ which engage the brake drum $i$ and tend, by frictional engagement therewith, to carry the brake drum about with the shaft $a'$. The brake drum $i$ is formed with or has bolted thereto an arm $i'$ extending upwardly through an elongated slot $j$ formed in a cylindrical brake anchor member $j'$ carried on an inwardly directed disc $j^2$ adapted to be bolted as by the bolts $j^3$ to the end of the housing $a^2$ of the motor. As the arm $i'$ moves, say, in a counterclockwise direction in the slot $j$, through the instrumentality of the frictional engagement of the brake shoes $f$, it bears against the end of an internal band brake $k$. This brake band is anchored, as at $k'$, to the brake anchor $j'$ and expands under the influence of the force applied against the action of the return spring $l$ and brakes the brake drum $m$ carried on the end of the shaft $a'$.

The weights $f$ and the spring $h$ are so proportioned that the brake shoes are held out of engagement with the drum $i$ at rest or low motor speeds. When the motor shaft exceeds a given speed of say 4,000 R. P. M. the centrifugal force throws the weights outwardly to engage the brake drum. The greater centrifugal force exerted by the weights $f$ the greater will be the resultant braking effort. Thus the maximum speed of the truck and the electric motor is governed under all conditions. The internal band brake is availed of to obtain a servo action, thereby multiplying the braking force.

It will be noted that the brake anchor $j'$ is so mounted upon the disc $j^2$ as to enclose the elements of the brake mechanism between itself and the outer disc $m'$ of brake drum $m$.

It will thus be seen that a self-contained braking unit has been provided which acts in the nature of a governor to automatically prevent the rotation of the motor armature at a speed greater than the permissive limiting peripheral speed of the motor armature.

Various modifications may be made in the disposition and configuration of the component elements going to make up the invention as a whole and no limitation is intended by the phraseology of the foregoing description except as indicated in the appended claims.

What is claimed is:

1. In a device of the character described, in combination, an electric motor, a brake drum carried with the motor shaft and freely rotatable with respect thereto, a spider having radial arms carried with the motor shaft, weights slidable on the arms, springs of predetermined strength to retract the weights, brake shoes carried with the weights to engage the drum and means carried with said drum to expand another brake shoe into operative engagement with another brake drum carried fixedly with said shaft.

2. In a device of the character described, in combination, an electric motor, a brake drum concentric with the shaft and freely rotatable with respect thereto, a spider carried with the shaft and having radial arms, weights slidable on the arms, springs to retract the weights, brake shoes carried with the weights to engage the freely rotatable drum, a brake drum carried by the shaft, a brake band, and means operable upon rotation of the first named brake drum to expand the brake band against the second named brake drum.

3. In a device of the character described, in combination, an electric motor, a spider having radial arms carried with the motor shaft, weights reciprocal on the arms, springs to retract the weights, brake shoes carried with the weights, a brake drum freely rotatable with respect to the motor shaft and concentric therewith, an annular brake anchor concentric with the brake drum carried with the motor housing and formed with a circumferentially extending slot, an arm carried with the brake drum and extending through the slot, a brake band secured to the brake anchor at one end and engaged at its other end by the arm, and a brake drum carried with the motor shaft and engageable by the brake band.

This specification signed this 23rd day of June A. D. 1926.

CHARLES FROESCH.